United States Patent [19]

Lieffers et al.

[11] 4,407,366
[45] Oct. 4, 1983

[54] METHOD FOR GAS CAPPING OF IDLE GEOTHERMAL STEAM WELLS

[75] Inventors: William C. Lieffers, Fullerton; Marjorie M. Hatter, Santa Ana, both of Calif.

[73] Assignee: Union Oil Company of California, Los Angeles, Calif.

[21] Appl. No.: 328,195

[22] Filed: Dec. 7, 1981

[51] Int. Cl.³ .................... E21B 33/068; E21B 47/06
[52] U.S. Cl. ............................. 166/250; 166/305 R; 166/311
[58] Field of Search ................... 166/244 C, 250, 302, 166/305 R, 311, 370, 371; 60/641.2, 641.3

[56] References Cited

U.S. PATENT DOCUMENTS

| | | | |
|---|---|---|---|
| 657,951 | 9/1900 | Mooney | 166/305 R |
| 2,245,870 | 6/1941 | Norman | 166/250 |
| 3,175,614 | 3/1965 | Wyllie | 166/250 |
| 3,381,523 | 5/1968 | Nettles | 166/305 R X |
| 3,550,445 | 12/1970 | Kiel | 166/250 X |
| 3,749,554 | 7/1973 | Fischer et al. | 252/8.55 X |
| 4,013,568 | 3/1977 | Fischer et al. | 175/69 X |
| 4,017,120 | 4/1977 | Carlson et al. | 166/372 X |
| 4,151,260 | 4/1979 | Woertz | 60/641.2 |
| 4,161,222 | 7/1979 | Pye | 175/66 |
| 4,262,747 | 4/1981 | Elliott et al. | 166/305 R |
| 4,357,802 | 11/1982 | Wahl et al. | 60/641.3 X |

OTHER PUBLICATIONS

Gilmore, "Hot New Prospects for Power from the Earth", *Popular Science*, Aug. 1972, pp. 56-60, 126.

*Primary Examiner*—Stephen J. Novosad
*Assistant Examiner*—George A. Suchfield
*Attorney, Agent, or Firm*—Dean Sandford; Gregory F. Wirzbicki; Gerald L. Floyd

[57] ABSTRACT

A method for capping an idle geothermal steam well so as to prevent hydrogen sulfide emissions and well damage due to steam condensation includes replacing geothermal steam in a well borehole with gas, perferably an inert gas such as nitrogen, and sealing the well at the wellhead. Thereafter additional quantities of the gas are bled into the well borehole at a rate that substantially prevents steam condensation in the borehole. The method includes purging the well bore with air sufficiently to assure all steam is swept out of the well before the gas is introduced.

22 Claims, 1 Drawing Figure

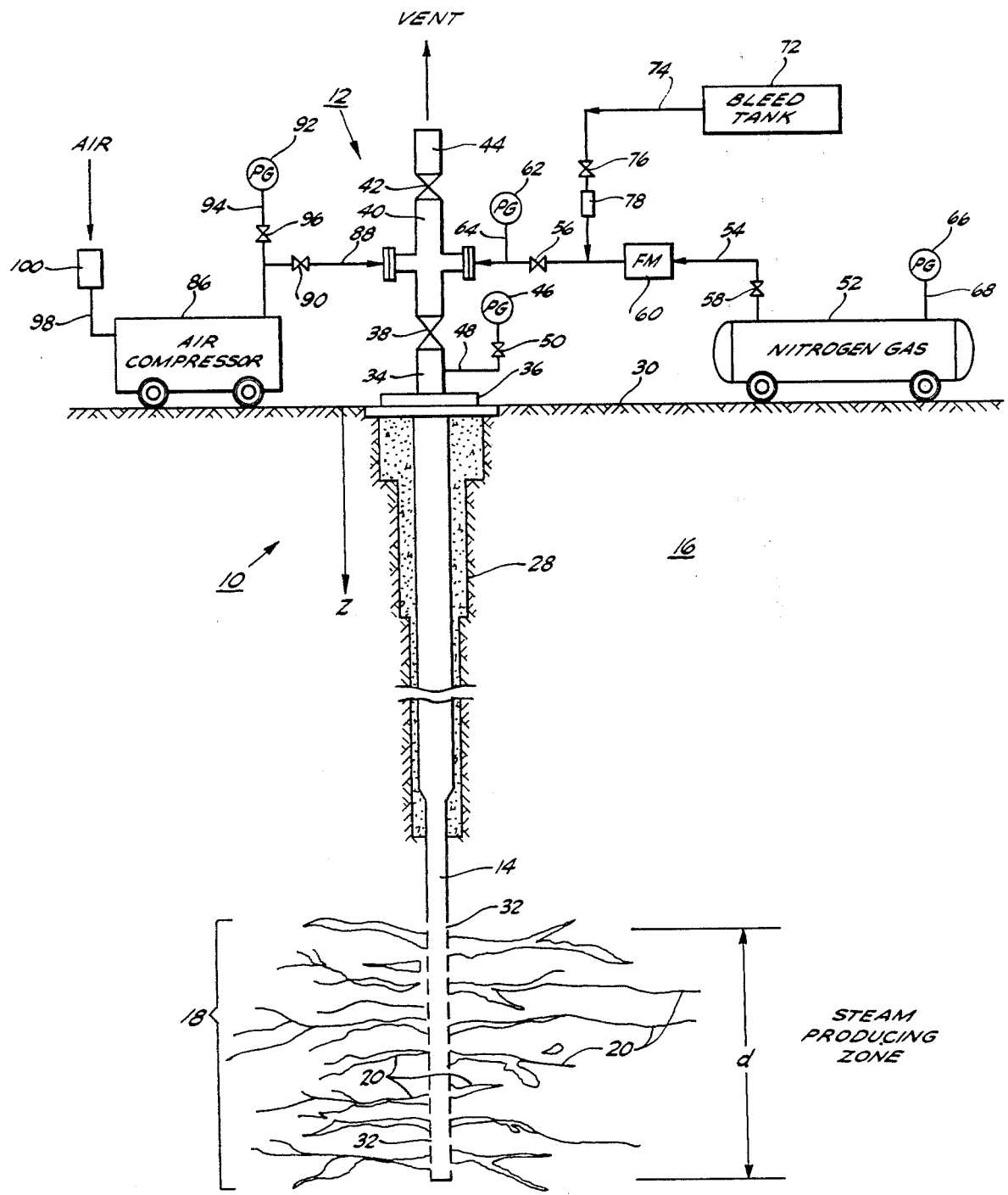

METHOD FOR GAS CAPPING OF IDLE GEOTHERMAL STEAM WELLS

BACKGROUND OF THE INVENTION

1. Field of the Invention

The present invention relates generally to the field of geothermal steam production and more particularly to methods for capping-off completed, but unused, geothermal steam wells.

2. Discussion of the Prior Art

Large subterranean reservoirs of naturally-occurring steam and/or hot aqueous liquid can be found in many regions of the world. Such reservoirs of geothermal steam and water or brine are particularly prevalent in regions where the thermal gradient near the earth's surface is abnormally high, as in regions of volcanic, geyser and fumarole activity, for example, along the rim of the Pacific Ocean.

In some areas, where readily available and conveniently located, geothermal steam and water or brine have for some time been advantageously used for therapeutic purposes, industrial processes and direct heating. Although there is current interest in further developing goethermal resources for these purposes, principal effort has more recently been directed more towards developing geothermal resources for production of electric power, the use of which is far less site-restricted than is the more direct use of the geothermal fluids for the above-mentioned purposes. In particular, the relatively recent, steep increases in hydrocarbon fuel costs and actual or threatened shortages of heretofore cheap and abundant hydrocarbon fuels has greatly heightened interest in development of alternative fuel sources, including the use of geothermal fluids for electric power generation.

General techniques are known whereby hot geothermal fluids can be used to generate electric power. For example, geothermal steam can be used in substantially the same manner as boiler-generated steam to drive a steam turbine/electric generator combination. Pressurized geothermal water or brine, having a temperature above about 400° F., can be flashed to a lower pressure to extract steam which is then used to drive a steam turbine/generator. Lower temperature geothermal water or brine can be used in a binary system to vaporize, in a closed loop, a working fluid, the resulting vapor being used to drive a gas turbine/generator.

Use of geothermal steam for production of electric power is the most direct geothermal application and is therefore preferred, being generally easier and less costly to use than geothermal water or brine for power generation. Consequently, although commercially usable sources of geothermal steam are estimated to be only about one fifth as prevalent as those of geothermal water or brine, considerable effort has been, and is being, directed towards developing new, or expanding existing, geothermal steam power plants. For example, since development of geothermal steam power plants started at The Geysers in California in the 1960's, electric power production by geothermal steam has there increased to a current level of about 1,000 megawatts, with development continuing towards a currently estimated capacity of about 1,500 to 2,000 megawatts. As a point of reference, an estimated five percent of the electric power generated in California is now being geothermally generated at The Geysers.

Continued development of geothermal steam for electric power production, in such locations as The Geysers, requires the building of new power plants and the annual drilling of many geothermal steam wells for providing steam to these new power plants.

By way of illustration, since about 20 pounds of geothermal steam is, on the average, required for each kilowatt of electric power produced, a typical 100 megawatt geothermal steam power plant requires about two million pounds of geothermal steam per hour. As good geothermal steam wells usually produce between about 150,000 and 200,000 pounds of steam per hour, each such typical geothermal steam power plant requires between about 10 and 15 geothermal steam wells for supplying steam.

Most geothermal steam wells require extensive drilling times and relatively high costs before they can be put into production. The high well drilling cost and comparatively long drilling time reflect the severe problems often encountered in drilling geothermal steam wells. The problems include the penetration of difficult geological formations, high well temperatures (typically about or above 500° F.), corrosive and abrasive characteristics of the air drilling process normally used in combination with the hot steam encountered, and the frequently remote and poorly accessible drill site locations.

Because of the 10 to 15 geothermal steam wells typically required for each new geothermal steam power plant and the high drilling costs and long drilling times involved, the drilling operations are usually spread over several years, for example, over the 3-to-5-year construction time of the related power plant. Although a protracted well drilling operation of this nature is advantageous from standpoints of capital outlay and optimum drilling equipment utilization, problems relating to completed geothermal steam wells standing idle for long periods of time, typically at least about a year and sometimes as long as four years, are thereby created. In particular, these problems relate to keeping the wells in operational condition without substantial steam loss or violation of air pollution standards that arise from inherent geothermal steam characteristics.

In this regard, the bottom 2,000 to 3,000 feet of most geothermal steam wells in the steam-producing zone are ordinarily uncased to enable the necessary high steam extraction rates. When geothermal steam wells of this type are shut in after completion and before use, so as to conserve steam and prevent air pollution, steam entering the lower, uncased well region from the surrounding formation rises in the borehole and condenses in cooler, upper borehole regions. As the resulting condensate flows back down the borehole, rocks and other debris along the uncased well region are loosened and washed down into the bottom, steam production zone. These fallen rocks and debris, as well as the condensate itself, soon fill the steam-producing zone and "kill" the well. Before being later operatively connected to a power plant, the well requires rework with a drilling rig, and to avoid the high costs associated with steam well reconditioning, most completed, but idle, geothermal steam wells have heretofore continuously vented an amount of geothermal steam sufficient to prevent well damage by steam condensation in the well. That is, sufficient steam has been vented from the wellhead of idle steam wells to maintain the temperature throughout the well above the steam condensation point. The amount of geothermal steam required to be vented for this purpose, of course, varies from well to well and according to the quality of the steam, but has been found to be typically between about 200 and 30,000 pounds per hour.

Venting of steam from geothermal wells to prevent condensation damage, although usually satisfactory for its intended purpose, not only wastes steam but, more importantly, causes air pollution problems which in many areas threaten its continued practice. Hydrogen sulfide is virtually always present in geothermal steam due, at least in part, it is believed, to action of anerobic bacteria on sulfides naturally present in the ground. The hydrogen sulfide concentration of the vented geothermal steam is typically in a range of between about 40 parts per million (ppm) and 1,000 ppm, which is usually higher than the point source hydrogen sulfide emission standards of between about 1 pound per hour per vent and 4.4 pounds per hour per vent applicable in many locations.

Although such strict hydrogen sulfide emission standards have not been uniformly enforced in the past, as the number of geothermal steam wells drilled increases and their intrusion into populated and/or environmentally protective localities grows, more rigorous enforcement of these emission standards is virtually certain. The expected result is that venting of geothermal steam wells to prevent condensation damage may soon be prohibited in many areas unless costly hydrogen sulfide abatement processes are provided.

Similar strict hydrogen sulfide emission standards are also usually applied to "used" steam discharged into the atmosphere from operational geothermal power plants and to the large scale venting, or "stacking," of geothermal steam during brief periods of power plant shutdown or slowdown. However, because of the large amounts of steam and hydrogen sulfide involved and the high cost of the power plant, expensive and complex hydrogen sulfide removal facilities of a permanent nature are feasible and are normally provided.

Unfortunately, facilities of the type used for treating large volumes of steam discharged from geothermal steam power plants, and which may, for example, utilize hydrogen sulfide removal processes, such as disclosed in U.S. Pat. No. 4,283,379 to Fenton et al., are not economically adaptable to removing hydrogen sulfide from the relatively much smaller quantities of steam vented in numerous, isolated locations from idle steam wells to prevent condensation damage.

The strict emission standards are usually also applied to hydrogen sulfide emissions in escaping drilling gas and steam during actual geothermal steam well drilling operations. Because processes and apparatus used for power plant hydrogen sulfide abatement have also not been found economically adaptable for well drilling operations, other hydrogen sulfide abatement processes have been developed for this purpose. One such hydrogen sulfide abatement process particularly useful for geothermal steam well drilling operations is disclosed in U.S. Pat. No. 4,151,760 to Woertz. Although the process disclosed by Woertz has been determined to be effective for removing hydrogen sulfide from emissions during steam well drilling operations and to be comparatively economical for this purpose, it is not as economically attractive for abating hydrogen sulfide emissions from vented, idle steam wells.

Accordingly, it is an object of the present invention to provide an effective, comparatively inexpensive method for preserving the operations integrity of idle geothermal steam wells which also satisfies strict hydrogen sulfide emission standards.

Another object of the present invention is to provide a method for capping, for long periods of time, an idle geothermal steam well without allowing substantial geothermal steam condensation and well damage due to such condensation.

Additional objects, advantages and features of the invention will become apparent to those skilled in the art from the following description.

SUMMARY OF THE INVENTION

In accordance with the present invention, a method for capping an idle geothermal steam well during a period of nonuse comprises sealing off the well, preferably at the wellhead, and injecting a gas other than steam into the well so as to provide a concentration gradient of the gas and geothermal steam in the well substantially preventing steam condensation in the well. Thereafter, additional amounts of the gas are injected into the well at a rate substantially preventing condensation of geothermal steam in the well during the period of well nonuse.

The capping gas selected to replace the geothermal steam may be any gas exclusive of steam. It may, for example, be a gas having a molecular weight lower than geothermal steam, in which case inert helium gas is preferred. It may also be a gas having a molecular weight higher than geothermal steam, with inert nitrogen gas then being a preferred selection.

In order to minimize costs, the geothermal steam well to be gas-capped is preferably first flushed with air, several well volumes of air being injected into the well to sweep the geothermal steam out of the well and back outwardly into fissures in the steam-producing zone.

To assure complete replacement of geothermal steam and/or air in the well, the capping gas is introduced into the steam well at a pressure preferably between about 10 psig and about 25 psig over normal wellhead pressure of the geothermal steam, and at an injection rate which assures turbulent flow of the capping gas into the well.

Effectiveness of the cap is enhanced by gas-capping the well just after the well to which the cap is applied has been production-tested, during which testing drilling debris is flushed out of the well and well conditions are stabilized.

The process may further include the step of monitoring the pressure, preferably wellhead pressure, of the gas-capped well. A substantially constant well pressure indicates that integrity of the gas cap is being maintained whereas a falling well pressure indicates problems with the gas cap and steam condensation in the well.

Capping of geothermal steam wells in this manner is inexpensive relative to the cost of reconditioning a condensation-damaged well, and makes unnecessary the venting of the well, with the concomitant discharge of pollutants such as hydrogen sulfide into the atmosphere.

BRIEF DESCRIPTION OF THE DRAWING

The invention will be more readily understood by reference to the drawing which depicts an exemplary geothermal steam well and associated apparatus for practicing the gas-capping method of the present invention.

DETAILED DESCRIPTION OF THE INVENTION

The present gas-capping method is especially directed towards capping or shutting in completed geothermal steam wells during periods of well nonuse, for example, during the period between well completion and connection of the well to an operational geothermal steam electric power plant. As more particularly described below, the gas-capping method replaces geothermal steam in the well, and ordinarily also in adjacent regions of the steam-producing formations, with a gas, so as to prevent steam condensation which occurs in unvented, conventionally capped geothermal steam wells. As a consequence of the gas capping, damage to the steam well, specifically, blocking of the steam-producing region with steam condensate and condensate-loosened debris from the above and surrounding earth formations, is prevented. The gas-capped wells are thus continually maintained in good steam-producing condition at a minimum of expense and without the emission of any atmospheric pollutants.

Depicted in the drawing is an exemplary geothermal steam well 10 with associated gas-capping apparatus 12 enabling practice of the present gas-capping method. As illustrated, borehole 14 of steam well 10 penetrates into the earth 16 for a sufficient depth to penetrate into geothermal steam-producing formation 18 a preselected distance, "d". Although obviously dependent upon local geological formation characteristics, the producing zone penetration distance, "d", may be between about 1,000 feet and about 3,000 feet, with a corresponding total well depth of between about 5,000 feet and about 8,000 feet.

Geothermal steam-producing formation 18 is characteristically comprised of a vast number of cracks or fissures 20 of various sizes and shapes which are interconnected in a manner providing a large subterranean geothermal steam reservoir or source of supply. Borehole 14 is shown as intersecting fissures 20 at about right angles, as appears to be typical; however, fissures 20 may extend in any direction from borehole 14, according to the particular geothermal steam-producing formation encountered.

Borehole 14 is lined by casing 28, typically to about the depth of producing formation 18, which may be several thousand feet beneath earth surface 30. Within producing formation 18, borehole 14 is ordinarily uncased in a region 32 in order that maximum inflow of steam from formation 18 into borehole 14 may be achieved. Casing 28, according to conventional well drilling practice, may vary in thickness with depth, casing 28 being thickest near earth surface 30.

Included in gas-capping apparatus 12 is conduit 34, the lower end of which is connected to wellhead cover plate 36. Conduit 34 communicates through plate 36 with borehole 14. Shut-off valve 38 is connected between the upper end of conduit 34 and the lower end of manifold 40. A second shut-off valve 42 is connected between the upper end of manifold 40 and venting conduit 44. Wellhead pressure gauge 46 communicates with conduit 34, adjacent to cover plate 36, through conduit 48 and valve 50.

A main gas supply contained, for example, in a mobile tank truck 52, is connected to manifold 40 through gas supply conduit 54, gas flowmeter 60 being installed in conduit 54 between shut-off valves 56 and 58. Gas pressure gauge 62 is connected to conduit 54, adjacent to manifold 40, through conduit 64. Gas supply pressure gauge 66 is connected to gas supply 52 through conduit 68. A secondary, inert gas bleed supply, for example, a pressurized tank 72, may be connected through conduit 74 into supply conduit 54 between flowmeter 60 and shut-off valve 56. Valve 76 and gas flowmeter 78 are installed in conduit 74.

As more particularly described below, well 10 is initially filled from tank truck 52 with a gas other than steam, preferably gaseous nitrogen, because of its inertness, ready availability and relatively low cost. After well purging and initial filling, additional amounts of the gas are bled into well 10 from secondary supply 72 at a rate, either continuously or intermittently, sufficient to maintain integrity of the gas cap. This additional bleeding of gas from secondary supply 72 into well 10 replaces initially injected gas (from main supply 52) which becomes reduced in volume as it cools, or is otherwise lost from well 10, for example, past wellhead coverplate 36, or into fissures 20 over a period of time. For short capping periods such additional injection of capping gas may, however, not be necessary, particularly for dry steam wells.

As shown in the drawing, separate bleed supply 72 is provided for bleeding gas into steam well 10 after the well has been initially filled from main supply 52, thereby enabling removal of supply 52, as may be desirable from cost or tank truck utilization standpoints. Alternatively, secondary supply 72 may be omitted and additional gas bled, after purging and initial well filling, into well 10 from main supply 52.

Air for flushing or purging well 10 of geothermal steam, prior to filling the well with gas from supply 52, is provided by compressed air source 86 which is flow-connected into manifold 50 through conduit 88. Air shut-off valve 90 is installed in conduit 88 and air pressure gauge 92 is connected by conduit 94 into conduit 88 upstream of valve 90, with valve 96 being installed in conduit 94. Preferably, the air supply comprises an air compressor 86 with an air inlet conduit 98 and inlet air filter 100. A pressurized air tank may be used in place of air compressor 86.

Although many different gases are theoretically capable of use in capping geothermal steam wells in accordance with the present gas capping method, for most applications the gas used is preferably, though not necessarily, non-flammable, non-hazardous, non-polluting and non-oxidizing. That is, the gas is preferably an inert gas. To avoid the gas "overturning" problem discussed below, a gas having a lower molecular weight than that of geothermal steam may be used, and, in this respect, helium is the preferred inert capping gas. However, the comparatively high cost of helium and the great difficulty in sealing well 10 against helium escape generally make use of helium impractical. Other lighter-than-steam gases which may be used include natural gas, methane and hydrogen. As above mentioned, however, nitrogen, because of its universal availability and low cost, as well as its relatively low molecular weight, is the most preferred gas for use in the gas capping process. Other heavier-than-steam gases, such as carbon dioxide or dry air, may alternatively be used as a capping gas.

As discussed above, when a geothermal steam well is conventionally capped or "shut-in", steam rising from the lower, steam-producing zone condenses in cooler, upper well regions. The resulting condensate flows back down the well, washing debris from uncased borehole regions into the steam-producing zone, eventually choking or "killing" the well. Costly well rework by a drilling rig is then required to restore the well to a producing condition before the well can be used to supply steam to a power plant.

The present gas capping method completely blankets a shut-in well with a gas so as to prevent geothermal steam from rising from the producing zone into the condensation zone, thereby preventing condensate-caused damage to the well. After the initial gas capping, which is preferably done within a short time after production testing of the well has been completed, the present method provides for bleeding additional amounts of capping gas into the well, throughout the shut-in period, at a rate sufficient to prevent steam condensation in the well.

In this respect, two mechanisms exist whereby steam can rise from the production zone into the condensation zone after the initial formation of the gas cap. These mechanisms are molecular diffusion and free convection. Molecular diffusion is the migration of molecules due to a concentration gradient; free convection, on the other hand, relates to the formation of buoyant convection cells of steam or "overturning" when the capping gas is denser than steam, as is the case, for example, when using the preferred nitrogen capping gas.

The manner in which the wells are initially capped and are subsequently maintained by gas bleeding into the well is based upon minimizing the effects of molecular diffusion and free convention. Due to molecular diffusion, as time progresses steam molecules diffuse upwardly into the capping gas and gas molecules diffuse downwardly into the steam. Since the number of upwardly diffusing steam molecules is equal to the number of downwardly diffusing gas molecules, the process is referred to as "equal molar counter diffusion." A concentration gradient zone of steam and gas is thereby formed in the well, the thickness of which, absent any subsequent bleeding in of gas, increases with time. However, when gas is additionally bled into the well at a constant rate, a steady state steam-gas gradient is established wherein the amount of steam removed from a section of well by bulk gas flow caused by gas bleeding is equal to the amount of steam entering the section due to molecular diffusion. When gas is bled at high rates into the well, steam is continually swept out of the well, and a sharp, steady state concentration gradient is maintained, the mechanism then being referred to as unicomponent diffusion.

Under steady state conditions, all the gas that enters a volume unit leaves that volume. This may be expressed by the following partial differential equation:

$$(\partial N_G/\partial Z) = 0$$

wherein $N_G$ is the number of moles of gas per unit time injected into the well and Z is distance measured down into the well.

Upon solving the above equation for $N_G$ for a binary steam-gas system and for typical geothermal steam wells, $N_G$ is found, for nitrogen, the preferred capping gas, to have a value of about $1 \times 10^{-5}$ moles per hour per square foot, corresponding to a required nitrogen bleed rate into the well of only about $1.86 \times 10^{-3}$ standard cubic feet per hour (SCFH). A corresponding gas bleed rate for helium is found to be about an order of magnitude higher. This means that bleed rates into typical wells of only about $1.86 \times 10^{-3}$ SCFH for nitrogen and only about $1.86 \times 10^{-2}$ SCFH for helium are required to prevent upward molecular diffusion of geothermal steam into the capping gas. Assuming a maximum of a four year gas-capping period, at these stated bleed rates only a total amount of about 65 SCF of nitrogen or about 650 SCF of helium is required for the entire capping period to compensate for molecular diffusion.

These small post-capping amounts of nitrogen or helium gas required to prevent upward molecular diffusion of steam are negligible compared to the amount of capping gas which would be expected to escape from the gas capped well through valves, seals, threaded fittings and the like during the well capped period. Therefore, the molecular diffusion mechanism can be safely ignored in determining the capping gas bleed rate necessary to maintain the integrity of the gas cap.

Free convection, in contrast, has a potentially very much greater effect on loss of a denser-than-steam capping gas than does molecular diffusion. Analysis of the free convection mechanism is, however, extremely difficult and unfortunately even the simplest kinds of free convection motion are not believed to have yet been given exact mathematical descriptions. In a gas filled, geothermal steam well, the situation is further complicated by presence of a vertical temperature gradient in addition to the density difference between the gas and steam. However, analysis does indicate that free convection gas velocities on the order of tens of feet per second may not be unrealistic. If so, these free convection velocities may be much too high for economical replacement of the lost gas by bleeding gas into the well. Consequently, it is important that no convection cells be formed during gas capping, this requirement dictating the manner in which the initial gas cap is formed.

For capping gases such as helium and others less dense than steam, formation of convection cells is not considered a problem because there is no overturning of the less dense capping gas. Thus, for lighter-than-steam gases, the capping gas is fed (referring to the drawing) directly from main gas source 52 through manifold 40 into well 10. Accordingly, valves 38, 56 and 58 are opened and valves 42 and 90 closed. Preferably, the approximate volume of well 10 is determined, usually by calculation, and about twice that volume of gas from source 52 is injected into well 10. This double-volume amount of gas injected into well 10 assures that at least most of the geothermal steam in well 10 is replaced by the gas, the steam being forced outwardly into fissures 20 as the capping gas is injected into well 10.

However, complete purging of all geothermal steam from well 10 back into fissures 20 is particularly important when the capping gas is denser than steam, if convection cells are to be prevented from forming. In effect, forcing the steam outwardly into the relatively horizontal fissures 20 changes the mechanism from a vertical mode, wherein steam remains in well 10 and in which free convection is considered to dominate, to a horizontal mode in which it is considered that free convection can also be ignored in determining the gas bleed rate into well 10 needed to maintain the gas cap.

Consequently, when a denser-than-steam capping gas, such as the preferred nitrogen, is employed, much more thorough steam purging of well 10 is believed necessary, thereby indicating that a number of well volumes of gas should be injected into well 10 when forming the gas cap. However, to avoid the costs associated with injecting a number of well volumes of the capping gas to achieve the required steam purging, the method of the invention provides for preliminary steam purging by compressed air from source 86. Accordingly, with valves 42, 56 and 58 closed and valves 38 and 90 open, several well volumes, preferably at least two well volumes and more preferably between about three and about six well volumes, of compressed air are injected from source 86 through manifold 40 into well 10. Immediately thereafter, valve 90 is closed, valves 56 and 58 are opened and capping gas from main gas source 52 is injected into well 10. Preferably, at least about two well volumes of capping gas are so injected.

In order to force the steam back into fissures 20, the air and/or gas-filling pressures (regardless of capping gas used) are preferably between about 10 psig and about 25 psig over normal wellhead pressure. Since normal wellhead pressure may be between about 450 psig and 490 psig, according to well location, filling pressures of between about 460 and 515 psig are typically used. The gas filling rate is selected to be sufficiently high to assure turbulent gas flow into well 10, as is important in assuring that no pockets of steam are trapped in the capping gas. Gas filling rates between about 1000 SCFM and about 5000 SCFM may be used.

After initial gas capping is achieved in the manner described above, gas valves 56 and 58 are closed, with valves 42 and 40 remaining closed. Air and main gas sources 86 and 52 may be removed for relocation to other well sites, assuming that separate gas bleed tank 72 is provided. If not, main gas source 52 is kept connected to well 10 for gas bleeding purposes.

Assuming that free convection problems are avoided through stream purging from well 10 during the initial gas capping operation and that the effects of molecular diffusion are negligible compared to normal gas losses, the post-capping bleed rate of gas into well 10 (if needed) from tank 72 or alternatively from main supply source 52, depends only upon the rate at which the capping gas is lost from well 10. If these additional quantities of capping gas are injected or bled into well 10 at a rate slower than the rate at which the capping gas escapes from well 10, the gas cap will eventually be lost and steam condensation damage to the well can be expected to occur. On the other hand, injecting gas into well 10 at a rate greater than that at which the gas escapes from the well results in unnecessarily high consumption of the gas and gas capping costs are increased over that which is actually necessary.

As can be appreciated, however, it may be difficult to accurately determine or predict the rate at which capping gas leaks or will leak from a gas-capped well since there are various potential gas escape paths, many of which are below the wellhead. Also over a protracted well shut-in period, the capping gas escape rate may fluctuate or may increase or decrease according to such factors as equipment corrosion and earth formation characteristics. Thus, means for monitoring gas cap condition are important.

An indirect indication of gas cap condition is provided by wellhead pressure, which may be read from wellhead pressure gauge 46. A relatively constant wellhead pressure indicates that the integrity of the gas cap is being maintained, whereas, a substantial, relatively rapid, decrease in wellhead pressure indicates that the steam producing zone may be filling with steam condensate and/or condensate-dislodged debris, which in turn is indicative of gas cap degradation or failure. Therefore, a gas bleed rate into well 10 just sufficient to maintain a relatively constant wellhead pressure may be used.

An alternative approach may be preferred in which a worst case gas bleed rate is established at a particular site, based on closely monitored gas cap testing of one or more of the wettest geothermal steam wells requiring the highest gas bleed rate to maintain the gas cap. This worst case gas bleed rate, assuming the cost of the capping gas required is not excessive, may then be applied to all the other geothermal steam wells at the site, with monitoring at wellhead pressure providing an additional margin of safety.

The present invention may be further described with reference to the following Example:

EXAMPLE

A geothermal steam well, corresponding to well 10 of the drawing, has a depth of approximately 5000 feet and a well volume of approximately 2700 cubic feet. Normal wellhead pressure is approximately 474 psig. Steam from the well is approximately 3 percent superheated. Wellhead temperature of the steam is approximately 467° F.

Approximately 300,000 SCF, or about 6 well volumes of air, at about 500 psig is injected into the well at a rate of approximately 1250 SCFM for a total well purge time of about 4 hours in anticipation of using nitrogen as a capping gas. To complete the initial gas capping of the well, approximately 168,000 SCF, or about 3 well volumes of gaseous nitrogen at about 500 psig is injected into the well at a flow rate of about 2800 SCFM. A corresponding gas filling time of about 1 hour is provided.

After completion of the initial gas capping, gaseous nitrogen, at a pressure of approximately 500 psig, is bled into the well at varying rates to maintain the gas cap. The total time duration on the test is approximately 480 hours, during which time approximately 80,000 SCF of the gaseous nitrogen is bled into the well after the initial gas-capping. The total gaseous nitrogen used is thus approximately 248,000 SCF.

Although a particular embodiment of the invention has been described, it will, of course, be understood that the invention is not limited thereto, since many obvious modifications can be made, and it is intended to include within this invention any such modification as fall within the scope of the claims.

Having now described the invention, we claim:

1. A method for capping a geothermal steam well during a period of well non-use, which comprises the steps of:
   (a) sealing said geothermal steam well in the vicinity of the wellhead thereof; and
   (b) injecting a gas other than steam into said geothermal steam well so as to provide a concentration gradient of said gas and geothermal steam in said well preventing the condensation of substantial amounts of geothermal steam in said geothermal steam well during said period of non-use.

2. The gas capping method defined in claim 1 wherein said gas injection step includes initially displacing geothermal steam in said geothermal steam well with said gas so as to form said concentration gradient and thereafter injecting such amounts of said gas into said geothermal steam well as are needed to prevent steam condensation.

3. The gas capping method defined in claim 1 wherein said gas has a molecular weight that is less than that of said geothermal steam.

4. The gas capping method defined in claim 3 wherein said gas is selected from the group consisting of helium, hydrogen, natural gas and methane.

5. The gas capping method defined in claim 1 wherein said gas has a molecular weight that is greater than that of said geothermal steam.

6. The gas capping method defined in claim 5 wherein said gas is selected from the group consisting of nitrogen, carbon dioxide and dry air.

7. The gas capping method defined in claim 1 further comprising the step of flushing said geothermal steam out of said geothermal steam well with air before said gas is injected into said geothermal steam well.

8. The gas capping method defined in claim 1 wherein said gas injecting step includes injecting said gas into said geothermal steam well at a rate causing turbulent flow of said gas into said geothermal steam well.

9. The gas capping method defined in claim 1 wherein said gas injecting step includes injecting said gas into said geothermal steam well at a pressure of at least about 10 psig above the normal geothermal steam wellhead pressure of said geothermal steam well.

10. The gas capping method defined in claim 9 wherein said pressure is between about 10 psig and about 25 psig above said normal wellhead pressure.

11. The gas capping method defined in claim 1 further comprising, prior to said gas injecting step, the step of cleaning out and stabilizing said geothermal steam well.

12. The gas capping method defined in claim 1 further comprising the step of monitoring pressure in said geothermal steam well during the period said geothermal steam well is gas capped and injecting said gas so as to maintain said pressure substantially constant.

13. The gas capping method defined in claim 12 wherein said pressure is monitored at the wellhead.

14. A method for capping a geothermal steam well during a period of non-use of said well so as to substantially prevent both well damage due to steam condensation in said well and emission of pollutants into the atmosphere, said method comprising the steps of:
(a) injecting air into said geothermal steam well so as to flush geothermal steam therefrom back into surrounding steam-producing formation fissures;
(b) initially injecting a sufficient amount of gas other than steam into said geothermal steam well to fill said geothermal steam well therewith; said inert gas being injected into said geothermal steam well at a preselected pressure greater than normal geothermal steam wellhead pressure;
(c) sealing said geothermal steam well in the vicinity of the wellhead thereof so as to prevent escape of said gas from said wellhead;
(d) injecting additional amounts of said gas into said geothermal steam well at a rate preselected for substantially preventing steam condensation in said geothermal steam well; and
(e) monitoring wellhead pressure so as to enable determining whether the integrity of the gas cap is being maintained.

15. The gas capping method defined in claim 14 further comprising the step of determining the volume of said geothermal steam well and wherein the step of injecting air into said geothermal steam well to flush geothermal steam therefrom includes injecting a volume of air into said well that is at least about twice said determined well volume.

16. The gas capping method defined in claim 15 wherein said volume of air injected into said geothermal steam well is between about 3 times and about 6 times said determined well volume.

17. The gas capping method defined in claim 15 wherein said gas is nitrogen and wherein said step of initially injecting gas into said geothermal steam well comprises injecting into said well a volume of said nitrogen that is at least about twice said determined well volume.

18. The gas capping method defined in claim 14 wherein said step of initially injecting gas into said geothermal steam well includes injecting said gas at a pressure between about 10 psig and about 25 psig above normal geothermal steam wellhead pressure and at a flow rate providing turbulent flow of said gas into said geothermal steam well.

19. The gas capping method defined in claim 18 wherein said gas flow rate is between about 1000 SCFM and about 5000 SCFM.

20. The gas capping method defined in claim 18 wherein said preselected gas flow rate is at least about 2800 SCFM.

21. A method for gas capping a geothermal steam well during a period of non-use thereof so as to substantially prevent steam condensation in said geothermal steam well and to substantially prevent emission from said geothermal steam well of atmospheric pollutants, said gas capping method comprising the steps of:
(a) cleaning and stabilizing said geothermal steam well;
(b) determining the volume of said geothermal steam well;
(c) mechanically sealing said geothermal steam well at the wellhead thereof;
(d) initially injecting a volume of air into said geothermal steam well that is at least about twice said determined well volume to purge said well of geothermal steam;
(e) initially injecting a volume of gaseous nitrogen into said geothermal steam well that is at least about twice said determined well volume;
(f) injecting additional quantities of said gaseous nitrogen into said geothermal steam well at a rate substantially preventing steam condensation in said geothermal steam well; and
(g) monitoring wellhead pressure so as to enable determining whether integrity of the gas cap is being maintained.

22. The gas capping method defined in claim 21 wherein said gaseous nitrogen is initially injected into said geothermal steam well at a pressure between about 10 psig and about 25 psig over normal geothermal steam wellhead pressure and at a flow rate between about 1000 SCFM and about 5000 SCFM.

* * * * *

UNITED STATES PATENT AND TRADEMARK OFFICE
CERTIFICATE OF CORRECTION

PATENT NO. : 4,407,366
DATED : October 4, 1983
INVENTOR(S) : William C. Lieffers and Marjorie M. Hatter It is certified that error appears in the above-identified patent and that said Letters Patent is hereby corrected as shown below:

Add claim 23, as follows:

23. The gas capping method defined in claims 1, 2, 7 or 14 wherein the gas is dry air.

"22 Claims, 1 Drawing Figure" should read -- 23 Claims, 1 Drawing Figure --.

Signed and Sealed this

Twenty-eighth Day of May 1985

[SEAL]

Attest:

DONALD J. QUIGG

*Attesting Officer*    *Acting Commissioner of Patents and Trademarks*